United States Patent
Al-Rashed

(10) Patent No.: US 7,429,295 B2
(45) Date of Patent: Sep. 30, 2008

(54) AQUEOUS CHEMICAL MIXTURE TO MITIGATE WATER ASSOCIATED PROBLEMS IN CONCRETE PAVEMENTS

(76) Inventor: Radi Al-Rashed, 1124 Eton, Richardson, TX (US) 75081

( * ) Notice: Subject to any disclaimer, the term of this patent is extended or adjusted under 35 U.S.C. 154(b) by 566 days.

(21) Appl. No.: 10/516,834

(22) PCT Filed: Jun. 6, 2002

(86) PCT No.: PCT/US02/18028

§ 371 (c)(1), (2), (4) Date: Dec. 2, 2004

(87) PCT Pub. No.: WO03/104159

PCT Pub. Date: Dec. 18, 2003

(65) Prior Publication Data

US 2006/0048670 A1    Mar. 9, 2006

(51) Int. Cl.
    *C04B 12/04* (2006.01)
(52) U.S. Cl. .................................. 106/600; 106/603
(58) Field of Classification Search ............ 106/600, 106/603
    See application file for complete search history.

(56) References Cited

U.S. PATENT DOCUMENTS

| | | |
|---|---|---|
| 3,980,597 A | 9/1976 | Shihadeh |
| 5,116,647 A | 5/1992 | Gaidis |
| 5,258,424 A | 11/1993 | Yagi |
| 5,300,606 A | 4/1994 | Aizawa |
| 5,338,345 A | 8/1994 | Scarborough |
| 5,356,716 A * | 10/1994 | Patel ................. 428/423.1 |
| 5,548,019 A | 8/1996 | Kawakami |
| 5,616,645 A | 4/1997 | Kuwamura |
| 5,709,065 A | 1/1998 | Krause |
| 5,747,561 A | 5/1998 | Smirnov |
| 5,766,323 A | 6/1998 | Butler |
| 5,958,601 A | 9/1999 | Salsman |
| 6,037,429 A | 3/2000 | Linert |
| 6,153,006 A | 11/2000 | Li |

* cited by examiner

*Primary Examiner*—Paul Marcantoni
(74) *Attorney, Agent, or Firm*—Shaper Iler LLP; Sue Z. Shaper

(57) ABSTRACT

A water-based mixture of multi compounds was invented for the purposes of treating and providing an ultimate protection for large areas of concrete pavements against moisture and moisture-associated problems. The mixture preferably works from within the concrete as well as at the surface. A water-repelling function prevents water from penetrating the concrete matrix. A hygroscopic and hydrophilic behavior of its crystallization system within a concrete matrix minimizes moisture transmission through capillaries and connected voids. As a result, the mixture promises to provide a permanent treatment for moisture related problems, such as damage caused by repeated freeze and thaw cycles and chloride ion penetration as from deicing salts, as well as a permanent treatment for the so-called alkali-silica reactions.

26 Claims, 4 Drawing Sheets

*Results of freeze and thaw test for a concrete sample treated with the present invention compared to an untreated sample.*

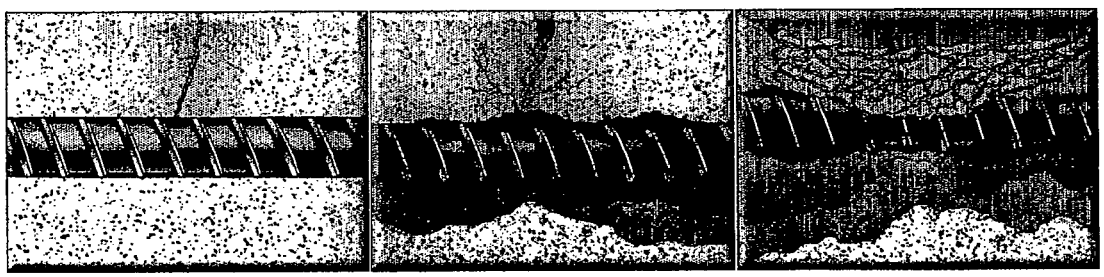
Figure 1. Untreated water problems in concrete structures result in structural failure.

Figure 2. Common water associated problems in concrete pavements.
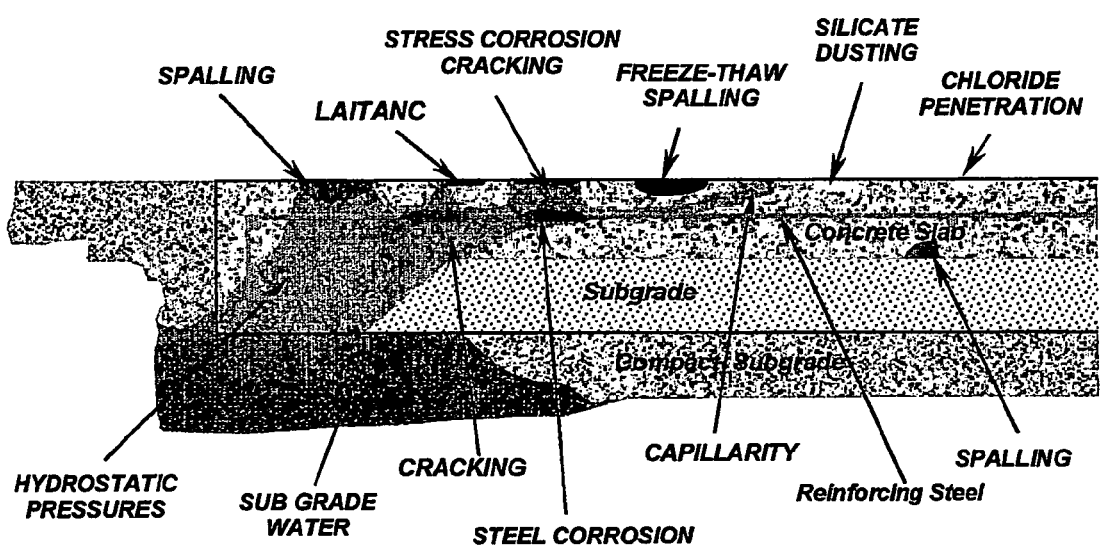

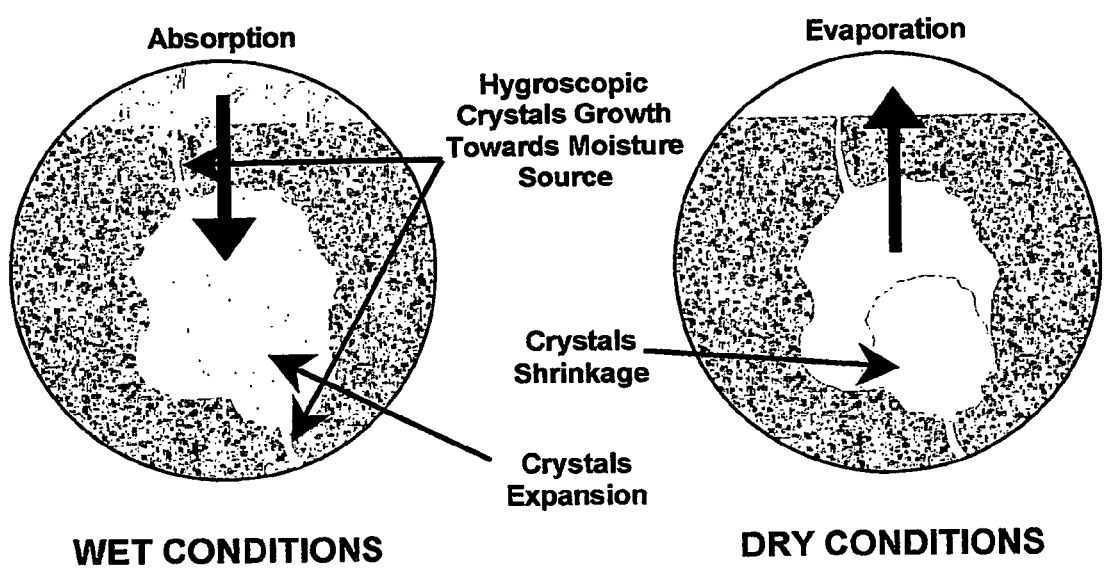
Figure 3. Behavior of the hygroscopic & hydrophilic crystalline material within concrete pores and capillaries under wet and dry conditions and its mechanism in eliminating water and vapor transmission.

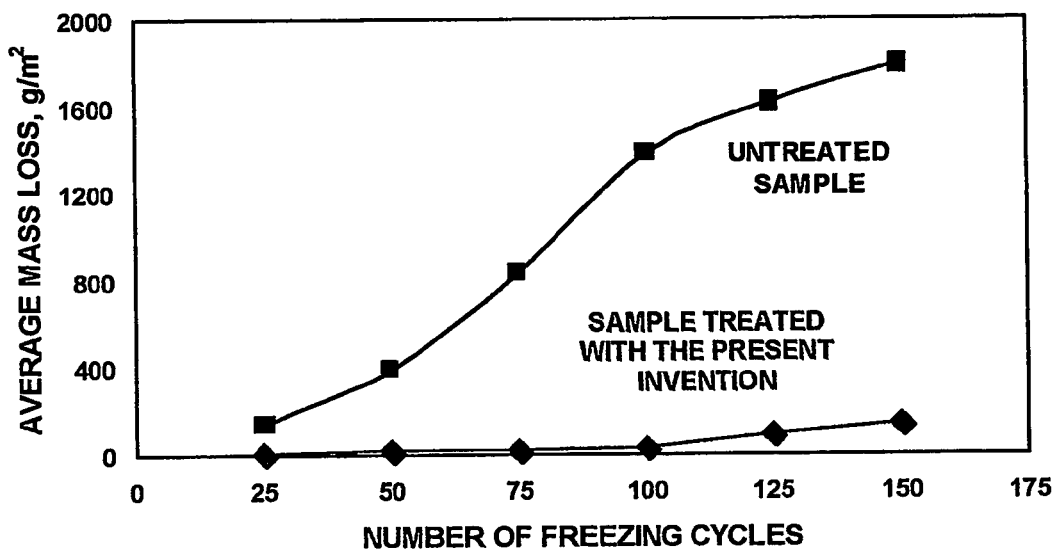
Figure 4. Results of freeze and thaw test for a concrete sample treated with the present invention compared to an untreated sample.

AQUEOUS CHEMICAL MIXTURE TO MITIGATE WATER ASSOCIATED PROBLEMS IN CONCRETE PAVEMENTS

CONTINUING DATA

This application is a 371 of PCT/US02/18028 filed Jun. 6, 2002.

FIELD OF THE INVENTION

The present invention relates to a water-based mixture of multi-chemical compounds, to a method of production thereof, and to a method using this mixture for cost-effective treatment and protection of concrete pavements on a large scale against moisture and water-associated problems.

More particularly, the present invention, being a complex water-based mixture of several active chemicals, was developed for the purpose of minimizing water penetration into concrete pavements from the surface, utilizing a chemical repelling agent, as well as minimizing the transmission of water and vapor through the concrete matrix (including from below) with a crystallization system, preferably a double action crystallization system of hygroscopic and hydrophilic behavior, all preferably based upon a single treatment, the chemical mix preferably shipped and stored in a single container and preferably applied by spraying. The invention is primarily intended for the treatment and protection of concrete bridges, concrete highways and concrete airport runways and taxiways and the like by a single application that results in essentially permanent maintenance-free and worry-free concrete pavements when it comes to water problems. As a further benefit, the treatment should prolong the concrete service life.

BACKGROUND OF THE INVENTION

Concrete structures are considered to be highly porous materials. The porosity primarily exists in the form of pores that are connected through capillary channels. Concrete voids are also formed as a result of air entrapped as well as water movements through the settling process and evaporation due to heat generated by the exothermic reaction of cement hydration. While it is important to maintain to a certain degree voids within the concrete in order for the so-called process of concrete breathing to take place, the porosity of concrete enhances the permeability of water in liquid and vapor phases through flow, diffusion, or sorption. This induces well documented water-associated problems within the concrete, such as the Alkali-Silica Reaction, freeze and thaw spalling as well as chloride ion penetration Such problems result in concrete deterioration which in return reduces the concrete structure's life span, especially if the reinforcement steel starts to corrode as a result of an oxidation process that is greatly enhanced by water and chloride ions (FIG. 1).

There are several water-associated problems in concrete. The most severe problems caused by water take place under wet conditions as a result of dissolving concrete alkalis, repeated freezing and thawing cycles and chloride ion penetration. Such conditions may result in further problems like spalling, silicate dusting, stress cracks, laitance and efflorescence, as shown in FIG. 2.

The hydration of cement produces calcium silicate hydrates with an amorphous structure that binds sand and aggregate to form a rigid concrete structure. The hydration process also produces calcium hydroxide, $Ca(OH)_2$, as a bi-product, which makes the concrete a highly alkaline material. In the presence of water, either in the liquid or the vapor stage, the hydroxide material becomes in the solution form with a pH value that can exceed 12.5, within the concrete matrix. This solution is considered chemically aggressive to the cement paste itself and to some minerals in the aggregate.

Siliceous materials, such as volcanic glass, opal, strained quartz, and cristobalite are particularly susceptible to hydroxide material in this solution form what results is known as the Alkali-Silica Reaction, commonly referred to as "ASR". ASR is a heterogeneous chemical reaction that takes place within concrete between the alkaline pore solution of the cement paste and silica containing parts of the aggregate particles. The product of such reaction is silicate gel that is able to combine with more water and swell. The swelling process results in an internal tensile strength build-up within the discontinuous aggregate pores. Over time, the internal pressures caused by the swelling process is sufficiently strong to cause cracking of the paste matrix which then can result in a compromised concrete with an open door to an increasing rate of deterioration. See Jakobsen, U. H., Thaulow, N. "Cause of deterioration of Canadian concrete railroad ties: Geology of aggregate source and concrete examination" Proc. 6th Euroseminar on Microscopy Applied to Building Materials, ICELAND, pp 187-206, 1997. Jensen, V., Meland, I. and Justnes, H.: "Alkali Aggregate Reaction in Concrete", Proceedings of 14th Nordic Concrete Research Meeting, Trondheim, Norway, pp. 62-63, August 1990. Geiker, M., Thaulow, N. "The Mitigation Effect of Pozzolans on Alkali-Silica Reactions" *4th CANMET/ACI International Conference of Fly Ash, Silica Fume, Slag and Natural Pozzolans in Concrete,* Istanbul, May 3-8, 1991. Haugen, M. and Jensen, V.: "Petrographic Analyses of Norwegian Slow/Late Expansive Alkali Reactive Aggregate", *Proceedings of 15th Nordic Concrete Research Meeting,* Gothenburg, Sweden, pp. 17-19, August 1993.

In climates where repeated cycles of freezing and thawing occur, concrete with sufficient moisture is susceptible to damage. When temperature drops below the freezing point ice starts to form within the pores of concrete. Since water increases its volume by 9% on freezing, water confined in pores between freezing bodies are therefore under compression and pores may dilate causing an increase in the internal stress against the surrounding concrete particles. Repeated freeze and thaw cycles result in the rupture and deterioration of the concrete structure due to fatigue stresses. See Beaudoin, J. J., and C. MacInnis "The mechanism of frost damage in hardened cement paste", *Cement and Concrete Research,* (4)139-147, 1974. Cheng-yi H., and R. F. Feldman, "Dependence of frost resistance on the pore structure of mortar containing silica fume". *ACI Journal,* September-October, pp. 740-743, 1985. Collins, A. R. "The destruction of concrete by frost", *Journal of the Institute of Civil Engineers,* London, Paper no. 5412, pp. 29-41, 1944.

The permeability of concrete allows chloride ions, such as from de-icing agents, to penetrate through the osmotic process in which the ions diffuse from the high concentrate zone to the low concentration zone. Under wet conditions, the concentration of chloride ions within the concrete becomes diluted, therefore, results in an increase in the driving force of ions diffusion. Chloride ions are considered as a high oxidizing agent. In concrete pavements, these ions acceleration the corrosion of steel reinforcing bars, thus reduce the life expectancy of the concrete structure itself In addition, chloride ions attack the concrete matrix by breaking the cement paste bond. This leads to the formation of more cracks that weakens the structure. See Bentz, D. P. and Garboczi, E. J., "A Computer Model for the Diffusion and Binding of Chloride Ions in Portland Cement Paste," NISTIR 5125, U.S. Department of Commerce, February 1993.

Several methods have been developed to overcome the problem of Alkali-Silica Reaction, such as the use of silica fume or fly ash (Sodium Carbonate) with the concrete mix. Silica fumes, as an additive, react chemically with calcium hydroxide in the presence of water within the concrete pores; this reduces the possibility of hydroxide to react with the aggregate silicates. On the other hand, sodium carbonate reduces the alkalinity of concrete through its reaction with the hydroxides. However, these methods are only applicable when silica fumes or fly ash are added to the concrete mix before paving.

As a treatment for existing concrete structures, solutions of sodium silicate have been used to partially neutralize the alkali materials within the concrete through a chemical reaction that produces hydrophilic silica gel material inside the pores (U.S. Pat. No. 5,747,171). However, because such solutions have not had a very low viscosity, their penetration efficiency has been very low. Therefore, treatment with silicate based solutions has typically been effective only in the upper thin layer of the concrete pavement, which makes them less effective in addressing high hydrostatic pressures from below.

Application of water repellant materials to the surface of concrete pavements such as those described in U.S. Pat. Nos. 5,338,345; 5,958,601; and 6,037,429 can be effective in reducing water penetration from the surface as they increase the surface tension of water to a degree that prevent it from passing through capillaries. However, such methods alone do not address moisture transmission from the negative side of the substrate.

Other treatment methods have utilized tartaric acid and soda ash with Portland cement in a slurry phase that has been applied to the surface in a thin coat. The presence of tartaric acid and soda ash produces insoluble hygroscopic crystals that block moisture transmission because of the so-called crystal growth process as a result of the relatively high affinity to moisture of these crystals. However, such method has been inefficient because of the complexity in application (must block off and keep wet for four days) as well as its need for repeated maintenance (because it is an inherently surface adhering application as opposed to a penetrating material).

As a further disadvantage, available methods of treatment have historically attempted to solve the water and moisture problems in concrete pavement by application of single techniques at a time. Therefore, complex problems have not been overcome without the implementation of multiple treatments. There is a need for an affordable material that can address multiple significant water and moisture-associated problems in concrete pavements in a single application, especially for large areas of pavements such in the case of concrete highways, bridges and airport runways.

Applicant's Prior Products

A Chem-Crete CCC100™ product was introduced to the market in 1969 as a waterproofing material for concrete structures. It has gone through several stages of research and development to improve its performance and efficiency by adjusting its formulation as well as raw materials involved and manufacturing conditions. The late Dr. Battista developed his latest formula of CCC100 in 1990. It is commonly referred to as the "Original Formula". CCC100 Original Formula, based on sodium silicate, is used globally as a waterproofing and hardening agent for old concrete structures as well as for its ability to work as a curing compound for fresh concrete. The waterproofing capability of CCC100 is achieved by an internal reaction that is triggered by a catalyst contained within the material to produce insoluble hydrophilic crystals which fill the pores and capillary channels inside the concrete.

More particularly, CCC100 is a combination internal waterproofing agent and curing agent for new concrete or a waterproofing agent for cured concrete. The product reacts with hydroxides (Portlandites) and tri-calcium silicate elements within the pore structure of a concrete assembly. The result of the reaction is the creation of a calcium-silicate hydrophilic grain with non-dilutent properties that absorb penetrating liquids and block the liquid passage through the concrete assembly that is under the influence of hydrostatic pressures. CCC100 is a colorless, transparent liquid that penetrates concrete and masonry building materials—protecting, preserving and strengthening them by:

Curing: CCC100 eliminates hairline cracking and temperature cracking on new concrete. When applied to freshly finished concrete, CCC100 will uniformly cure the concrete through a chemical reaction as well as form a moisture barrier which eliminates temperature cracking.

Sealing: CCC100 penetrates into the concrete, forming a chemical reaction which locks the pores from within, giving the concrete a deep seal.

Waterproofing: CCC100 becomes a permanent, integral part of the concrete, thus waterproofing and substantially bonding and strengthening the structure of the concrete.

Hardening: CCC100 solidifies the component parts of the concrete into one solid mass which increases the density, toughens and hardens. CCC100 treated concrete has been tested 30% harder after 28 days than fully cured, untreated concrete. This hardening prevents dusting, pitting and rutting of concrete floors and other masonry surfaces.

Neutralizing Alkali: As the CCC100 progressively penetrates the concrete it neutralizes the alkali and forces it to the surface where it can be washed off.

Bonding: CCC100 prepares the treated surface for paints, caulking compounds, adhesives and floor coverings and increases the bond and life of these materials. CCC100 contains no silicone and is coatable and compatible with any type of covering.

Treatment Results: With one application of CCC100, concrete and other masonry is cured, sealed and waterproofed and is rendered highly resistant to oils, grease and most acids. The component parts of the concrete are solidified into a solid mass which increases the density, toughens and hardens and prevents dusting, pitting and rutting of the surface. The surface alkali is neutralized and efflorescence and the leaching of lime and alkali is stopped. The surface is prepared for paint, adhesives and all floor coverings.

Treatable Materials: Concrete, concrete block, mortar, plaster, stucco, terrazzo, exposed aggregate and any sand, aggregate cement combination.

Limitations: Do not apply CCC100 in the following cases:
  When temperatures fall below 35° F.
  To areas previously treated with curing or sealing agents unless these coatings have been removed by chemical or mechanical means.
  Note: Must be kept off glass, glazed tile and aluminum.

In 1992, and after intensive research under the directions of Dr. Battista, Chem-Crete developed another waterproofing product that is used strictly for old concrete, known as SofiX (CCC700). SofiX, based on tartaric acid and anhydrous sodium carbonate, has been proven to perform efficiently in waterproofing and hardening old concrete structures with severe moisture problems. Although a similar concept to the CCC100, when applied to concrete structures SofiX penetrates more deeply into the surface to produce insoluble hygroscopic crystals, which have the ability to block concrete pores and capillary channels. The hygroscopic property of those crystals allows them to travel further within the concrete toward a moisture source in a continuous process.

More particularly, Chem-Crete SOFIX® is a crystallization waterproofing product in liquid form. It has the advantages of similar known prior powder form crystallization waterproofing products, together with the advantages of easy liquid application. The product can be applied to concrete like a paint and results in the same waterproofing quality as the prior known crystallization waterproofing cementitious coatings. Chem-Crete SOFIX is formulated with chemical agents that enhance deep penetration within the concrete capillaries where the active chemicals react to form hygroscopic crystalline material which permanently block concrete pores. The chemical activity of these crystalline materials is reactivated upon further contact with moisture, and thus they keep growing inside the concrete providing dormant additional protection.

The chemicals in Chem-Crete SOFIX may include other active reagents that react with hydroxides (Portlandites) to produce di and tri calcium silicate elements within the pore structure of a concrete assembly, resulting in more dense concrete and creating a hydrophilic crystallization with non-dilutent properties. Under the influence of high hydrostatic pressures, these crystals fill the voids, thus doubling the pore-blocking effects towards the liquid passage through the concrete assembly and vapor moistures.

Chem-Crete Sofix™ is a colorless, transparent liquid that penetrates concrete and masonry building materials—protecting, preserving and strengthening them.

USES: Warehouse floors, foundations and slabs, reservoirs, industrial plants, swimming pools, subway tunnels, elevator pits, interior walls in parking garages.

FEATURES:
Easy application
High waterproofing performance
Penetrates concrete and seals capillary tracts and hairline cracks
Can be applied to old and green concrete
Protects concrete in-depth
Multiple function: waterproofing, sealing and bonding which increase adhesive properties for products such as: epoxy coatings, polyurethane coatings, asphalt coatings and paints.
Stops efflorescence
Cost effective
Non-toxic
Resists high hydrostatic pressure
Exterior and interior applications
Capillary waterproofing for concrete TREATABLE MATERIALS: concrete, concrete block, mortar, plaster, stucco, terrazzo, exposed aggregate and any sand, aggregate cement combination.

LIMITATIONS: Do not apply Chem-Crete SOFIX in the following cases:
When temperatures fall below 35° F.
To areas previously treated with curing or sealing agents unless these coatings have been removed by chemical or mechanical means.

COVERAGE: Number of coats needed: One coat needed on new concrete after 7 days of placing the concrete at the rate of 200 sq. ft. per gallon. For old concrete: one coat application at the rate of 150 sq. ft. per gallon. Coverage depends on the temperature and porosity of the concrete.

STORAGE LIFE: One year—Agitate bucket or drum before using.

Both products, the CCC100 and the SofiX, are water-based, non-toxic materials. They have been proven to solve moisture problems in concrete under moderate and severe conditions and to be used as a water barrier for concrete surfaces prior to the application of any kind of adhesives. In addition, they have performed well to protect concrete structures against freeze-thaw effect and chloride ions penetration from deicing salts.

Both products are of a non-film forming type that protect concrete internally. Although, they both work effectively, there was a need for a product which would protect concrete against water and moisture problems at the surface, by repelling, while allowing the concrete to breath. As a result, the CCC1000 product was developed in 1992 shortly prior to introducing SofiX to the market. CCC1000 is a water-based concrete/stone sealer and water repellent. CCC1000, based on potassium methyl silicate, penetrates up to 2 inches depending on the porosity of concrete structures and reacts to permanently coat the inner surface of pores and capillaries with a non-visible gel-like material that becomes part of the concrete substrate. It exhibits water sealing and repelling capability.

More particularly, Chem-Crete 1000® is a ready to use, clear, somewhat penetrating, liquid concrete sealer and water repellent. It is colorless, non-staining, non-film forming and non-yellowing. Chem Crete 1000 penetrates the surface and chemically reacts to become an integral part of the substrate. The chemical action results in a gel-like coating of the pore walls to block the ordinary capillary action of water. This produces a highly effective, breathable, moisture barrier. Because the Chem-Crete 1000 barrier is within the substrate, it is further protected from weathering and helps keep treated surfaces clean by resisting the entrance of airborne dirt and impurities. It eliminates efflorescence, and spalling from freeze-thaw cycles and protects against airborne dirt, smog, industrial fumes, acid rain and most other atmospheric chemicals. The deterioration of surface paints and adhesives, due to alkali attack is eliminated. Surface textures and colors are not affected. Chem-Crete 1000 is economical, fast and easy to use and is non-toxic, non-flammable and is a water clean-up product.

Chem-Crete 1000 is used above and below grade to protect against moisture penetration by capillary action. It is formulated to protect dense concrete and masonry surfaces in one application, without altering the color or textural appearance of the surface. Substrates include precast concrete, tilt-up concrete, monolithic concrete, stucco, clay, brick, limestone and other natural or manufactured stone. Chem-Crete 1000 is formulated to protect porous masonry, concrete block and other similarly porous materials without altering the color or textural appearance of the treated surface. It is a water based product and is an excellent primer for paint.

Chem-Crete 1000 penetrating concrete sealer and water repellent is a formulation of clear solution derived from several chemical solids. It is furnished in solution and requires agitation. The active ingredients form a breathable moisture barrier within the treated substrate during and following the drying-curing period. Chem-Crete 1000 is water based and non-flammable.

All the Chem-Crete products above have been used together sequentially, usually starting with a single application of SofiX followed by an application of CCC100 and then a one-coat application of CCC1000. Areas that were treated with this system were protected against a plurality of problems associated with water and water vapor, utilizing the hydrophilic and the hygroscopic properties of CCC100 and SofiX, respectively, as well as the repelling characteristic of CCC1000. However, in order to achieve this enhanced performance, the protection system was complicated in the application technique, as many critical steps were involved. As a result, it constituted made a non-cost effective system for mass applications such as highways and airport runways.

After intensive research, the instant inventor has now been able to combine the essence and functionality of the above Chem-Crete products into new single products that are cost-effective, storable with an acceptable practical shelf life and that provide enhanced single treatment protection for concrete substrates. Preferably, the new product is manufactured from scratch, using some of the same chemicals used in the production of the three original Chem-Crete products, some different chemicals and with improved ratios. In particular, the type and quantity of performance enhancers and their ratios have been adjusted. Less preferable versions could be produced by mixing certain amounts of prior CCC100, CCC1000 and/or SofiX concentrates significantly diluted with water.

In accordance with the present invention, there is provided a composition comprising a well-balanced aqueous mixture of active chemicals that are environmentally friendly and free of volatile organic compound (VOC). Some of the chemicals act independently while some work in conjunction with each other and via chemical reactions to achieve the goals of the treatment. The term "mixture" is used to indicate primarily a mixture of chemicals. This mixture is typically and preferably substantially in solution form However, some settling out is expected. The concentrations used can affect the solution form. An emulsion form is conceivable. A residue, or even a small amount of gel in the bottom, from the solution form is possible. Shaking or mixing prior to spraying or rolling, etc. is advised. The term "multi-compounds" indicates a plurality of chemicals.

The chemical and physical functions of a preferred embodiment of the present invention can be summarized by noting the following beneficial function of certain components:

Surfactant (preferred embodiment being nonylphenol polyethylene glycol ether): a component chemical that behaves as a wetting agent in the mixture mixture to reduce the surface tension of component chemicals, thus allowing certain components of the product to deeply penetrate into concrete structures through capillaries.

Antifoaming agent (preferred embodiment being isopropyl alcohol): a component chemical that reduces or suppresses bubble formation, thus eliminating air entrapment within the mixture during the application.

Emulsifier & cleaner (preferred embodiment being a combination of alkyl-benzene-sulfonic acid, sodium hydroxide and sodium hypochlorite): an agent(s) that helps open concrete pores and capillaries by emulsifying dirt and impurities to allow the mixture to penetrate easily.

Water repellent (preferred embodiment being potassium methyl siliconate): a component chemical that reacts and bonds to the concrete surface resulting in a significant increase in the surface tension of water, thus preventing water from penetrating through capillaries.

Crystallization chemicals (preferred embodiment being a combination of sodium hydroxide, sodium silicate, sodium carbonate and/or tartaric acid): a group of active component chemicals that generate a hygroscopic and/or hydrophilic crystallization system, and preferably both, within the pores and capillaries of concrete.

In preferred embodiments of the present invention, these active component chemicals are combined together, through a preferred multi-stage manufacturing process, to produce a new product that promises to more permanently solve moisture and water-associated problems in concrete pavements by a double or triple action technique with a single application. The water repelling efficiency should preferably exceed that of the established federal specifications. The crystallization system adds to the water repellent feature the hygroscopic and/or hydrophilic behaviors, all together in one system. The product preferably can be stored and shipped in one container, with a shelf life of at least six months if handled properly, and can be advantageously applied by spraying. Rolling or brushing is also possible, of course.

Furthermore, the present invention preferably does not have any effect on the color or appearance of the treated concrete.

SUMMARY OF THE INVENTION

The instant invention comprises an aqueous mixture for application to concrete pavements for protection against water associated problems. The mixture comprises multi-compounds mixed into a relatively stable aqueous mixture form. In one embodiment, the compounds include alkali metal silicate, potassium methyl siliconate and at least 50% by weight water. Preferably the compounds include at least one surfactant. Preferably the compounds include at least one anti-foaming agent. Preferably the compounds include at least one emulsifier/cleaner agent. Preferably the water includes deionized water. Preferably the compounds also include tartaric acid and sodium carbonate.

The invention includes a method for protecting concrete pavement comprising applying an aqueous chemical mixture to the concrete pavement, preferably only once, and curing the mixture. The applying and curing achieves from one mixture repelling water penetration at the pavement surface and blocking water penetration within concrete matrices of the pavement by at least hydrophilic or hygroscopic crystallization. Preferably the blocking includes blocking by hydrophilic and hygroscopic crystallization.

The invention includes a method for making a stable containerizable aqueous mixture for application to concrete pavements to protect from water associated problems, the method comprising gradually adding alkali metal silicate (preferably sodium silicate) to at least 50% by weight water in a reactor and mixing; slowly introducing potassium methyl siliconate to the water/alkali metal silicate solution and mixing; and letting the material settle for approximately one hour while covered before re-packing. Preferably the method also includes initially adding tartaric acid in small portions at a time to the water while continuously agitating and adding sodium bicarbonate (preferably anhydrous) in small portions at a time, mixing between adding additional portions. Preferably also the method includes adding a water-based mixture of at least one surfactant, at least one anti-foaming agent and at least one cleanser/emulsifier to the sodium silicate/water mixture and mixing. The invention includes the product produced by the methods of manufacture.

BRIEF DESCRIPTION OF THE DRAWINGS

A better understanding of the present invention can be obtained when the following detailed description of the preferred embodiments are considered in conjunction with the following drawings, in which:

FIG. 1 illustrates untreated water problems in concrete structures and how they can result in structural failure.

FIG. 2 illustrates common water associated problems in pavements.

FIG. 3 illustrates the behavior of hygroscopic and hydrophilic crystalline material within concrete pores and capillaries under wet and dry conditions and its mechanism in eliminating water and vapor transmission.

FIG. 4 illustrates results of a freeze and thaw test for concrete sample treated with the present invention compared to an untreated sample.

DETAILED DESCRIPTION OF THE PREFERRED EMBODIMENTS OF THE INVENTION

The present invention is recommended for the treatment and protection of large scale concrete pavements, mainly concrete bridges, concrete highways and airport runways and concrete taxiways. Application of the invention can be very simple, through a spraying mechanism that is adequate enough to spray large areas in a short period of time. Rolling or brushing or other application techniques are also possible. The recommended coverage of the invention at an anticipated dilution rate is 200 $ft^2$/gallon in a single application. During the application of preferred embodiments there would be no need for a complete closure of areas to be treated. In fact they could be opened to traffic shortly after the treatment, since the mixture preferably penetrates through the surface in a relatively rapid process because of a preferred low viscosity.

After the product is applied and as soon as its water starts to dry, the chemical action starts to take place at the surface as well as deeply within the concrete pores and capillaries.

As part of the preferred embodiment of the present invention, preferably potassium methyl silicate reacts with carbon dioxide from the air within the upper layer of the pavement as well as at the surface. The chemical reaction is activated using UV light to produce an invisible resin-like material that coats the surface as well as the walls of capillaries and pores. The material becomes part of the concrete structure via chemical bonds that are highly resistant to strong acids and alkali solution as well as most aggressive chemicals. The material functions as a water repellant by increasing the surface tension of water to a degree that makes it essentially impossible for water to penetrate treated pavements through capillaries. As a result, the invisible resin-like material component maintains a dry surface that effectively resists damage caused by freeze and thaw. In addition, it results in significantly reducing the moisture content of the concrete, thereby bringing down the driving force for chloride ions penetration to a negligible limit. The water repelling function of the resin-like surface coating material component of the present invention should remain essentially permanent for the life span of the pavement, which tends to eliminate need for additional treatments.

As a further part of the preferred embodiment, multiple simultaneous chemical reactions take place within the capillaries and pores of the concrete matrix as a result of the application of an embodiment of the present invention. Those reactions are triggered and/or accelerated by the increase in the concentration of chemicals as a result of water evaporation. Two major reactions are: one, tartaric acid reacts with sodium carbonate, triggered by the in increase in concentration as a result of water evaporation, to produce hydrated crystals of sodium tartrate. Two, sodium silicate (or an alkali metal silicate) reacts with calcium hydroxide from the concrete matrix to produce tri-calcium silicate. Further, both reactions when present interact chemically and kinetically with each other. As a result, preferably sodium tartrate and tri-calcium silicate become physically bonded to each other in a complex form of insoluble crystallization material These crystals combine both the hygroscopic and hydrophilic properties with a great affinity to water in its liquid and vapor phase.

The preferred hygroscopic and hydrophilic crystalline material, generated by the preferred embodiment of the invention, provides almost efficient protection for concrete pavements by optimally controlling the mass transfer of water and water vapor across the concrete matrix through capillaries and pores. The hydrophilic property of the crystals works mostly against water in the liquid stage while the hygroscopic characteristic works against water vapor.

Because of the hydrophilic behavior, under wet conditions, the crystals absorb water and swell in the form of a compressible gel material to fill the voids. As a result, they prevent further water from passing through Experimental work shows that these crystals have the ability to absorb enough water to make them swell up to sixteen times their size in the dry stage. The swelling stops as soon as the crystals reach the size of the void they are contained in.

On the other hand, the hygroscopic behavior becomes highly effective in the presence of water vapor, especially under relatively high hydrostatic pressures. Because of their extremely high affinity to moisture, the crystals continuously crawl slowly inside the pores and capillaries toward the source of moisture. As they absorb moisture, the sodium tartrate part of the crystals becomes more hydrated. This results in what is called crystal growth. The crystal growth leads to eliminating moisture transmission across the concrete matrix. Our tests show that the crystals were able to grow and travel about 3.5" over a period of 12 weeks.

Under dry conditions, the crystals release the moisture they absorbed through evaporation. This results in bringing back these crystals to their original size, allowing the concrete to breath The crystals stay dormant till the swelling and crystal growth processes are reactivated as a result of any increase in the moisture content inside the concrete from any side.

FIGS. 1 and 2 illustrate water problems in concrete structure. FIG. 3 illustrates the behavior of the preferred hygroscopic and hydrophilic crystalline material within concrete pores and capillaries under wet and dry conditions and its mechanism in eliminating water and vapor transmission.

The preferred embodiments of the present invention, as a result, can comprehensively protect concrete pavements against water and moisture associated problems. A crystallization system minimizes the dissolution of calcium hydroxide contained within the concrete by moisture contact. As result, alkali silica reactions are minimized. Furthermore, minimizing water penetration and moisture transmission can dramatically reduce the driving force for chloride ion diffusion into concrete. As a result, the structure becomes protected against chloride ion attack. In addition, the structure will be protected against damage caused by repeated freezing and thawing cycles. As illustrated in FIG. 4, freeze and thaw test shows that after 150 cycles of freeze and thaw, the damage to a treated concrete sample was less than the damage caused by 25 cycles to an untreated sample.

Composition of Preferred Embodiments of the Invention

One preferred embodiment of the invention is formulated by combining nine different chemicals in a mixture form using deionized water.

To our knowledge, an optimum quantitative chemical composition of the invention can be achieved if a mixture is prepared using the data given in Table 1 on weight basis. Such composition should provide a mixture of about 27% solid content that has a very low viscosity, of approximately 2.4 centipoises, to assure deep penetration.

TABLE 1

Optimum chemical composition of the invention.

| Chemical Name | wt. % |
| --- | --- |
| Alkylbenzensulfonic Acid (pure) | 0.008 |
| Isopropyl Alcohol (Anhydrous) | 0.121 |
| Nonylphenol Polyethylene Glycol Ether (pure) | 0.013 |
| Sodium Hydroxide (50% NaOH aqueous solution) | 0.005 |
| Sodium Hypochlorite (12.5% NaOCl aqueous solution) | 0.009 |
| Sodium Silicate solution, (40% solid content) | 19.212 |
| Tartaric Acid (pure solid form measured by weight) | 1.816 |
| Anhydrous Sodium Carbonate (pure solid measured by weight) | 1.288 |
| Potassium Methyl Siliconate (40% aqueous solution) | 4.312 |
| Deionized water | 73.217 |
| Total | 100 |

Altering the chemical composition of the above preferred embodiment of the present invention by adjusting the weight percentage of one or more chemical ingredients, to a certain degree, should not have a significant effect on the composition's overall performance, especially as long as the method of application is adjusted accordingly. For instance, a reduction in the solid content results in a diluted form of the invention. In such embodiment the material should be applied to concrete pavements at a higher rate. The overall performance of the most preferred embodiment of the invention in treated concrete pavements is believed to be acceptable if the content of the above chemicals remain approximately within the ranges given in Table 2.

TABLE 2

Minimum and maximum weight percentage of chemicals through which the invention will remain effective.

| Chemical Name | Minimum wt. % | Maximum wt. % |
| --- | --- | --- |
| Alkylbenzensulfonic Acid (pure) | 0.004 | 0.020 |
| Isopropyl Alcohol (Anhydrous) | 0.050 | 0.300 |
| Nonylphenol Polyethylene Glycol Ether (pure) | 0.005 | 0.075 |
| Sodium Hydroxide (50% NaOH aqueous solution) | 0.002 | 0.025 |
| Sodium Hypochlorite (12.5% NaOCl aqueous solution) | 0.003 | 0.025 |
| Sodium Silicate solution, (40% solid content) | 7.500 | 25.000 |
| Tartaric Acid (pure solid form measured by weight) | 0.750 | 3.500 |
| Anhydrous Sodium Carbonate (pure solid measured by weight) | 0.532 | 2.482 |
| Potassium Methyl Siliconate (40% aqueous solution) | 1.650 | 7.500 |
| Deionized water | 65.000 | 82.500 |

Methods of Production

Production of the present invention preferably utilizes a multi-step procedure for mixing the chemicals, believed to minimize any interactions that may cause the material to crystallize during manufacturing. For this purpose a reactor vessel with a medium speed agitator is recommended.

Although the invention may be produced in one or two steps, taking certain precautions, to our best knowledge the chemicals of the most preferred embodiment are best mixed in three different stages. The product of the first stage is referred to as the mix1. The product of the second stage is referred to as the mix2. Both mix1 and the mix2 are considered as intermediate products for the purpose making the most preferred finished product in the preferred three stages.

Disclosed below, is the best procedure as well as, to our knowledge, the best chemical composition, to be used for the making of the most preferred embodiment of the invention in a preferred ready-to-use form.

Stage One: Making of Mix1

Batch size=100 Liters, Net weight=98.896 kg

TABLE 3

Materials required for the manufacturing of a 100 liters of Mix1 (Performance Enhancers)

| Chemical | Weight (kg) |
| --- | --- |
| Deionized water | 93.830 |
| Sodium Hydroxide (50% NaOH aqueous solution) | 0.153 |
| Nonylphenol Polyethylene Glycol Ether (pure) | 0.423 |
| Sodium Hypochlorite (12.5% NaOCl aqueous solution) | 0.298 |
| Alkylbenzensulfonic Acid (pure) | 0.265 |
| Isopropyl Alcohol (Anhydrous) | 3.927 |
| Total Weight | 98.896 |

Mixing Procedure:

1. Place the deionized water in the reactor and start the mixer at a medium speed.
2. Add the sodium hydroxide solution and mix for about 2 minutes.
3. Add the Nonylphenol Polyethylene Glycol Ether ($C_{33}H_{60}O_{10}$) and agitate for 5 minutes.
4. Gradually add the sodium hypochlorite solution and agitate for 5 minutes.
5. Add alkylbenzensulfonic acid and agitate for 15 minutes.
6. Reduce the mixer speed and gradually pour the isopropyl alcohol and mix for additional 10 minutes.
7. Cover the container and allow the material to cool to room temperature and settle for 24 hours before using in production of the concentrate.

Stage Two: Making of Mix2

Batch size=100 Liters, Net weight=117.915 kg

TABLE 4

Materials required for the manufacturing of a 100 liters of Mix2

| Chemical | Weight (kg) |
| --- | --- |
| Deionized water | 42.125 |
| Sodium Silicate solution, (40% solid content) | 65.406 |
| Mix1 from Stage One | 10.384 |
| Total Weight | 117.915 |

Mixing Procedure:
1. Place the deionized water in the reactor and start the mixer at a medium speed.
2. Gradually add the sodium silicate solution and mix for about 15 minutes.
3. Gradually add the Mix1 and continue mixing for an additional 10 minutes.

Stage Three: Making of the Finished Product

Batch size=100 Liters, Net weight=109.552 kg

TABLE 5

Materials required for the manufacturing of a 100 liters of the Invention in its ready-to-use form.

| Chemical | Weight (kg) |
| --- | --- |
| Deionized water | 63.487 |
| Tartaric Acid (pure solid form measured by weight) | 1.989 |
| Anhydrous Sodium Carbonate (pure solid measured by weight) | 1.411 |
| Mix2 from Stage Two | 37.945 |
| Potassium Methyl Siliconate (40% aqueous solution) | 4.72 |
| Total | 109.552 |

Mixing Procedure:
1. Place the deionized water in the reactor and start the mixer at a medium speed.
2. Add small portions of the tartaric acid at a time while continuously agitating. Make sure that all the acid crystals have dissolved before adding a second portion. Continue mixing for about 15 minutes after adding the whole amount of the acid.
3. Using very small portions at a time, add the sodium carbonate slowly to prevent coagulation. Allow 2-3 minutes of mixing before adding additional portions. Continue mixing for another 15 minutes at low speed.
4. Gradually add Mix2, mixing for about 10 minutes thereafter.
5. Slowly introduce the potassium methyl siliconate mixture, mix for 5 minutes, and then let the material settle for one hour while covered before repacking.

The foregoing description of preferred embodiments of the invention is presented for purposes of illustration and description, and is not intended to be exhaustive or to limit the invention to the precise form or embodiment disclosed. The description was selected to best explain the principles of the invention and their practical application to enable others skilled in the art to best utilize the invention in various embodiments. Various modifications as are best suited to the particular use are contemplated. It is intended that the scope of the invention is not to be limited by the specification, but to be defined by the claims set forth below.

What is claimed is:

1. An aqueous mixture for application to concrete pavements for protection against water associated problems, comprising:
    multi-compounds mixed into a stable aqueous mixture form, the compounds including alkali metal silicate, potassium methyl siliconate, a surfactant, an emulsifier and at least 50% by weight water;
    wherein the mixture includes a percent by weight of alkali metal silicate solids equivalent to mixing in between 7.500% to 25.000% by weight of a alkali metal silicate solution of a 40% solids content; and
    wherein the mixture is sealed into a container such that an unopened container maintained above 10° C. has a shelf life of at least six months.

2. The mixture of claim 1 wherein the compounds include tartaric acid and sodium carbonate.

3. The mixture of claim 2 wherein the compounds include at least one anti-foaming agent.

4. The mixture of claim 3 wherein the compounds include at least one cleaner agent.

5. The mixture of claim 4 wherein the water includes deionized water, the anti-foaming agent includes isopropyl alcohol and the cleaner includes sodium hydrochlorite.

6. The mixture of claims 1, 2, 3, 4 or 5 wherein the surfactant includes nonylphenol polyethylene glycol ether; and the emulsifier includes a fatty acid and at least one of sodium hydroxide, tetra potassium pyrophosphate and hexameta potassium phosphate.

7. The mixture of claim 6 wherein the fatty acid includes alkylbenzensulfonic acid.

8. The mixture of claims 1, 2, 3, or 4 wherein the water includes deionized water.

9. The mixture of claim 6 wherein the water includes deionized water.

10. An aqueous mixture for application to concrete pavements for protection against water associated problems, comprising:
    deionized water;
    sodium silicate solids equivalent to mixing in between 7.500% to 25.000% of the mixture by weight of a sodium silicate solution of a 40% solids content;
    potassium methyl siliconate equivalent to mixing in between 1.650% to 7.500% by weight potassium methyl siliconate of a 40% aqueous solution;
    between 0.004% to 0.020% of the mixture by weight pure alkylbenzensulfonic acid;
    between 0.050% and 0.300% of the mixture by weight anhydrous isopropyl alcohol;
    between 0.005% to 0.075% of the mixture by weight pure nonylphenol polyethylene glycol ether;
    sodium hydroxide equivalent to mixing in between 0.002% to 0.025% by weight of the mixture sodium hydroxide of a 50% NaOH aqueous solution;
    sodium hypochlorite equivalent to mixing in between 0.003% to 0.025% of the mixture by weight sodium hypochlorite of a 12.5% NaOCl aqueous solution;
    between 0.750% to 3.500% of the mixture by weight tartaric acid of a pure solid form measured by weight; and
    between 0.532% to 2.482% of the mixture by weight anhydrous sodium carbonate of a pure solid measured by weight;
    mixed into a stable aqueous mixture form.

11. The aqueous mixture of claim 10, comprising;
    approximately 0.008% by weight alkylbenzensulfonic acid of a pure form;
    approximately 0.121% by weight isopropyl alcohol of a anhydrous form;
    approximately 0.013% nonylphenol polyethylene glycol ether of a pure form;
    sodium hydroxide equivalent to mixing in approximately 0.005% by weight sodium hydroxide of a 50% NaOH aqueous solution;
    sodium hypochlorite equivalent to mixing in approximately 0.009% sodium hypochlorite of a 12.5% NaOCl aqueous solution;
    sodium silicate solids equivalent to mixing in approximately 19.212% by weight sodium silicate solution of a 40% solid content;

approximately 1.816% by weight tartaric acid of a pure solid form measured by weight;

approximately 1.288% anhydrous sodium carbonate of a pure solid measured by weight;

potassium methyl siliconate equivalent to mixing in approximately 4.312% by weight potassium methyl siliconate, of a 40% aqueous solution; and approximately 73.217% by weight deionized water.

12. A method for protecting concrete pavement, comprising:

applying the aqueous mixture of claim 1 to the concrete pavement; and curing the mixture; thereby, by the means of the application of the mixture, repelling water penetration at the pavement surface; and blocking water penetration within concrete matrices of the pavement by at least hydrophilic crystallization.

13. A method for protecting concrete pavement, comprising;

applying the aqueous mixture of claim 1 to the concrete pavement; and curing the mixture; thereby, by the means of the application of the mixture, repelling water penetration at the pavement surface; and blocking water penetration within concrete matrices of the pavement by at least hygroscopic crystallization.

14. The method of claim 12 wherein the blocking of water penetration within concrete matrices of the pavement includes blocking by hygroscopic crystallization.

15. A method for making a stable containerizable aqueous mixture for application to concrete pavements to protect from water associated problems, comprising:

(1) forming a dilute mixture of at least a surfactant and emulsifier;

(2) gradually adding sodium silicate to water in a reactor and mixing;

(3) gradually adding the surfactant/emulsifier mix to the sodium silicate mix;

(4) adding to water tartaric acid in small portions at a time while continuously agitating;

(5) adding sodium bicarbonate in small portions at a time to the tartaric acid mix;

(6) gradually adding the surfactant/emulsifier/sodium silicate mix to the tartaric acid/sodium bicarbonate mix;

(7) slowly introducing potassium methyl siliconate to the surfactant/emulsifier/sodium silicate/tartaric acid/sodium bicarbonate mix and mixing;

wherein the mixture includes at least 50% by weight water and a percent by weight of alkali metal silicate solids equivalent to mixing in between 7.500% to 25.00% by weight of a alkali metal silicate solution of a 40% solids content, and (8) letting the material settle for approximately one hour while covered before containerizing;

whereby a container maintained above 10 degrees C. has a shelf life of at least six months.

16. The method of claim 15 including in step (1) forming a water based mixture of (a) at least one of sodium hydroxide, tetra potassium pyrophosphate and hexameta potassium phosphate; (b) a fatty acid; and (c) nonylphenol polyethylene glycol ether.

17. The method of claim 16 including in step (1) adding sodium hypochlorite and isopropyl alcohol to the mixture.

18. The method of claim 16 wherein the fatty acid includes alkylbenzensulfonic acid.

19. The method of claims 15, 16, 17 or 18 wherein the water comprises deionized water.

20. The product produced by the method of claims 15, 16, 17 or 18.

21. The product produced by the method of claim 19.

22. The method of claim 12 that includes opening treated pavement for normal use within at least one hour of application.

23. An aqueous mixture for application to concrete pavements for protection against water associated problems, comprising:

multi-compounds mixed into a stable aqueous mixture form, the compounds including at least 50% by weight water; sodium silicate solids equivalent to mixing in at least 7.5% to 25.0% by weight of a sodium silicate solution of a 40% solids content; at least 0.75% by weight tartaric acid of a pure solid form measured by weight; at least 0.5% by weight anhydrous sodium carbonate of a pure solid measure by weight; an emulsifier including at least one of sodium hydroxide, tetra potassium pyrophosphate and hexameta potassium phosphate together with a fatty acid; and a surfactant including nonylphenol polyethylene glycol ether;

and wherein the mixture is sealed into a container such that an unopened container maintained above 10° C. has a shelf life of at least six months.

24. The mixture of claims 1, 2, 3, 4, or 5 wherein the alkali metal includes sodium.

25. The mixture of claims 1, 2, 3, 4, or 5 wherein the sodium carbonate includes anhydrous sodium carbonate.

26. The mixture of claims 1, 10, 11 or 23 wherein the mixture has a viscosity of approximately 2.4 centipoises.

* * * * *